(12) United States Patent
Orlandi et al.

(10) Patent No.: US 8,307,765 B2
(45) Date of Patent: Nov. 13, 2012

(54) PROCESS AND EQUIPMENT FOR PRINTING ON NON-WOVEN-FABRIC

(75) Inventors: Vittorio Orlandi, Milan (IT); Roberto Pedoja, Cuasso Al Monte (IT)

(73) Assignee: Ahlstrom Corporation, Helsinki (FI)

( * ) Notice: Subject to any disclaimer, the term of this patent is extended or adjusted under 35 U.S.C. 154(b) by 882 days.

(21) Appl. No.: 10/583,331

(22) PCT Filed: Mar. 16, 2004

(86) PCT No.: PCT/IT2004/000127
§ 371 (c)(1),
(2), (4) Date: Mar. 6, 2007

(87) PCT Pub. No.: WO2005/075199
PCT Pub. Date: Aug. 18, 2005

(65) Prior Publication Data
US 2007/0163454 A1    Jul. 19, 2007

(30) Foreign Application Priority Data
Feb. 6, 2004    (WO) .................. PCT/IT2004/000042

(51) Int. Cl.
*B41F 13/02*    (2006.01)
(52) U.S. Cl. ........................................ 101/484; 101/485
(58) Field of Classification Search .................... 101/484
See application file for complete search history.

(56) References Cited

U.S. PATENT DOCUMENTS

| | | | | |
|---|---|---|---|---|
| 3,542,506 A | * | 11/1970 | Shaw et al. ...................... 34/454 |
| 3,915,090 A | * | 10/1975 | Horst et al. .................... 101/181 |
| 4,677,680 A | * | 6/1987 | Harima et al. ................. 356/394 |
| 4,922,337 A | * | 5/1990 | Hunt et al. ..................... 101/484 |
| 5,312,500 A | * | 5/1994 | Kurihara et al. .............. 156/62.4 |
| 5,373,365 A | * | 12/1994 | Brown et al. .................. 356/430 |
| 5,597,642 A | | 1/1997 | Schleinz et al. |
| 5,743,184 A | | 4/1998 | Skudrzyk |
| 5,774,635 A | * | 6/1998 | Kuusisto et al. ............... 358/1.6 |
| 5,881,440 A | * | 3/1999 | Deeming et al. ................ 28/104 |
| 5,967,050 A | * | 10/1999 | Seymour ....................... 101/484 |
| 6,024,018 A | * | 2/2000 | Darel et al. .................... 101/484 |
| 6,298,779 B1 | * | 10/2001 | Gotanda et al. ............ 101/350.1 |
| 6,427,586 B2 | * | 8/2002 | Takahashi ..................... 101/484 |
| 6,502,288 B2 | * | 1/2003 | Black et al. ..................... 28/104 |
| 6,688,222 B2 | * | 2/2004 | Cattaruzza et al. ........... 101/212 |
| 2002/0157547 A1 | | 10/2002 | Cattaruzza et al. | |

FOREIGN PATENT DOCUMENTS

| | | |
|---|---|---|
| DE | 37 44 000 | 7/1989 |
| EP | 0 522 640 | 1/1993 |
| GB | 1 575 160 | 9/1980 |

* cited by examiner

*Primary Examiner* — Jill Culler

(74) *Attorney, Agent, or Firm* — Dickstein Shapiro LLP

(57) ABSTRACT

The present invention relates to a process and equipment (1) for creating prints on non-woven-fabric and, particularly, relates to a process and to equipment (1) which allows the creation of color prints on non-woven fabrics at high speed while at the same time maintaining optimal print quality on wet or dry product, either in-line with production or off-line. The NWF may be printed over only a small percentage with respect to its surface (2-3%) up to a coverage of 100% of its surface, depending on the use of the NWF itself, i.e.: personal hygiene, domestic hygiene, matting, non-woven fabric for clothing, table-cloths, handkerchiefs, curtains (furnishings), bags, containers for items.

10 Claims, 3 Drawing Sheets

PROCESS AND EQUIPMENT FOR PRINTING ON NON-WOVEN-FABRIC

The present invention relates to a process and equipment for creating prints on non-woven-fabric (NWF) of the spun lace type hydroentangled NWF and, particularly, relates to a process and to equipment which allows the creation of colour prints on spun-lace type non woven fabrics at high speed whilst at the same time maintaining optimal print quality. The print may be made on dry NWF or on wet NWF.

It is known that printing on fabrics in general may be carried out in a substantially direct, indirect manner, by discharge or by resist independently of the type of process used.

The direct method, the most common in the field, consists of applying the ink or paste (which is subsequently polymerised and dried) directly onto the fabric and subsequently vaporization in order to fix said ink or paste onto the fibres of the fabric. Particularly, direct printing may be carried out by using conventional roller printing or flat screen printing procedures.

Generally, with reference to roller printing (flexographic or serigraphic techniques), the method provides the use of equipment essentially consisting of a large drum, defined as the roller press, on which roll a number of engraved rollers, as many as the number of colours to be reproduced. In the case of the serigraphic technique, there are two rollers for each dye, one is used for transporting the dye and the other for taking up and depositing the dye. Passing between the engraved rollers and the press roller, held tensioned, are the fabric to be printed and a continuous mesh providing a backing function. The ink is provided to the engraved rollers by a brush and by one of said rollers which takes it up from an underlying tray, whilst a metallic blade eliminates any excess ink. This printing typology allows the reproduction of text and/or drawings on fabric in a rapid and economical manner.

The adoption of the aforesaid technology has also been proposed for printing text and/or drawings onto non-woven-fabrics (spun-lace, spun-bonded, mechanically needle entangled, entangled and coated). Nevertheless, the method and equipment just described have not yet found any real practical use in the non-woven-fabric field due to several drawbacks.

Indeed, it is known that with non-woven-fabric, being a soft, stretchable and easily creased material, when passing between the drum and an engraved roller, the fibres which make it up are subjected to crushing pressure and to a dragging force which will cause its elongation or stretching in the longitudinal direction with respect to the length of the non-woven-fabric and, by way of reaction, a "shortening" or shrinkage of the width of the non-woven-fabric. Between one drum and roller pair and the subsequent pair, the non-woven-fabric instead tends to return to relaxed conditions or even to form creases, precisely in response to being released from the tensioning to which its fibres have been subjected.

The formation of creases does not allow the attainment of a substantially flat surface onto which an acceptable print, especially one using many colours, may be achieved.

Accordingly, it would be necessary to devise a stretch control system which allows keeping the non-woven-fabric tensioned or "stretched" over its entire length while printing various dyes, without elongation of the fibres.

Similar systems exist wherein the stretching effect is created by applying a slight acceleration to the material emerging from the fabric processing equipment.

Furthermore, this system will have to be such as to be compatible with maintaining such a material advancement speed through the equipment as to allow the economically acceptable productivity of the printing process.

At present however, it has not been possible to propose a printing process on non-woven-fabric which might overcome the threshold value of 20 m/min whilst maintaining good print quality. Indeed, if the drawing speed of the non-woven-fabric is increased, then it is also necessary to increase the stretching effect in order to avoid the aforesaid formation of creases. This however, given the nature of the fibrous material of which non-woven-fabric is composed, risks causing variable elongations to the non-woven-fabric itself, thus creating serious problems for printing.

Consequently, the production speed is highly curtailed to the value reported above, which is not such as to allow the achievement of an economically advantageous production process.

Furthermore, in the case where it would be desirable to print in colour, then the above described stretch control would not be sufficient to ensure a constant tension along the entire height (width) of the material with the consequence of causing superimposing of the individual colours.

The technical problem at the heart of the invention is therefore that of providing equipment for printing on non-woven-fabric (spun-lace) which allows obviating the drawbacks just mentioned and at the same time satisfying the needs mentioned, obtaining not only monochrome, but multicolour prints.

Such a problem is resolved by equipment for printing on non-woven-fabric as set out in the appended main claim.

A first object of the present invention is therefore to provide an equipment for printing on non-woven-fabrics (spun-lace, spun-bonded, mechanically needle entangled, entangled and coated) also multicolour, on wet or dry product, directly on a production line or off-line.

A second object of the invention is to provide a printing process of non-woven-fabrics (spun-lace) that is adequate for the above specified purpose.

Further characteristics and the advantages of the present invention will be more apparent from the following description of an embodiment, given by way of non-limiting example, wherein.

Figure 1:
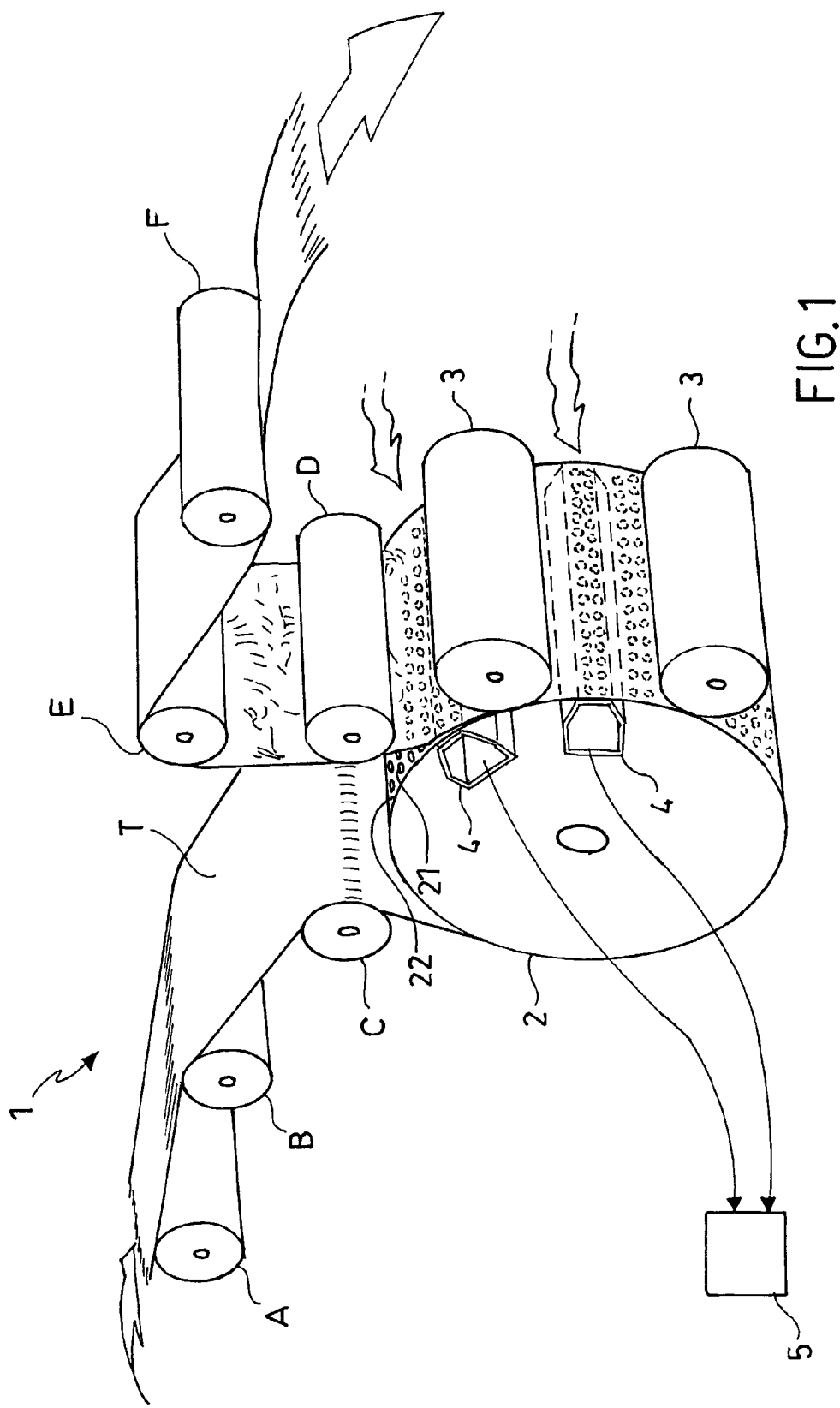
FIG. 1 represents a diagrammatic view of an equipment for printing on non-woven-fabric (spun-lace, spunbonded, mechanically needle entangled, entangled and coated) in accordance with the invention.

In the present description, some particular terms are used which are defined in the following.

The term "non-woven-fabric" (NWF) identifies a material produced from the binding of natural and/or synthetic fibres and/or threads using various methods different from the weaving of typically textile based materials. The non-woven-fabric can consist of one or more layers of said material. This material is used for the production of hygiene products (household and personal), medical products and linen in general, furnishing fabrics, floor coverings, reinforcing for garments, sanitary items, cleaning materials such as dusters, abrasives, clothing items in general, household items such as mats and the like, table cloths and the like, bags or sheets for packing, handkerchiefs, curtains.

The term non-woven-fabric "backing" (web) is generally used in the field in order to indicate a continuous sheet of non-woven-fabric on which, according to the present invention, a monochromatic or multicolour printing process is carried out.

With the term "spun lace" is meant a type of non-woven-fabric or a type of technology for obtaining said material wherein fibres of polyester (PE), polypropylene (PP), PLA (polylactates), PVA (polyvinylalcohol), polyethylenesulphone (PES), acrylic polymers, Lyocell® (i.e. fibres of regenerated cellulose, obtained by the procedure of dissolution and spinning in organic solvent, without the formation of derivatives), Tencell® (three layered products with fibres on the two outer sides and fluff pulp in the middle or two layered fibre/fluff pulp products), cotton, viscose are generally short fibres which are interconnected through a hydroentangled process.

The term "spun-bonded" indicates a type of non-woven-fabric or a type of technology for obtaining said material wherein synthetic fibres such as polyamides, polyethylenes, polyesters, polyethylenesulphones, Lyocell® and Tencell® are extruded through a spinneret and the emerging filaments are bombarded with a jet of compressed air which causes the elongation of said fibres (long fibres) and their electrostatic charging such as to cause their mutual repulsion which results in their radom falling onto a conveyor belt.

The term "thermo-bonded" indicates a type of non-woven-fabric or a corresponding technology wherein synthetic or natural fibres of different type are bound together through heating which causes either the melting of a thermoplastic component of the fibre, or the melting of a binder added to the fibre as the bonding agent, such as an acrylic derivatives based agent, synthetic or natural rubber latex or other synthetic polymers.

The term "height" in reference to non-woven-fabric indicates the width, in the transverse direction with respect to the length, of a single layer of material which is subjected to the printing process in suitable equipment.

The term "grammage" defines the weight of the non-woven-fabric per square meter.

The term "on-line" is in reference to a process which is carried out substantially uninterruptedly along a production line itself, comprising several operating stations directly connected to one another.

The term "off-line" is instead in reference to a particular manufacturing process of a non-woven-fabric which is carried out separately with respect to a production line, in reference to a different procedure or treatment of said non-woven-fabric.

Following a number of tests, it has been found that through particular adaptations of conventional flexographic technologies, it has been possible to achieve printing on non-woven-fabric (spun-lace) of optimal quality, and at the same time in economically advantageous terms.

Such adaptations consist in particular modifications carried out on the flexographic machines known per se in the field, such as the machine schematically described in the introductory section to the present invention. Overall, the modifications are substantially represented by:
- modifying the press roller so as to provide it with suction holes;
- positioning suction fan inside the press roller flush with said holes and at the nip of the various engraved rollers;
- feeding hot air between the individual print rollers in order to dry the dye;
- possibly providing pumps with water separators in the case wherein it is desired to print on wet non-woven-fabric;
- individually motorising each rotating body, i.e. inlet, outlet transport rollers for the product, press roller and engraved rollers
- providing a control and command unit in order to mutually control and monitor the angular speeds of said rotating bodies;
- providing inlet rollers with the function of mechanical wideners.

With reference to FIG. 1, the numeral 1 generally indicates an equipment for printing on non-woven-fabric. Said equipment 1 comprises a press roller 2, also called support roller, at least one engraved roller 3 or printing body, means 4 for holding the sheet of non-woven-fabric on the support 2, a water separator 5, a control and command unit 6 (illustrated diagrammatically in FIG. 2) and guide means A, B, C, D, E, F suitable to guide and support a sheet of non-woven-fabric being inlet and outlet from said equipment 1.

Particularly, the press roller 2 is a conventional roller, in which however, through holes 21 have been made along its entire circumferential band 22. These through holes 21 allow communication between the outer surface of the circumferential band 22 and the interior of the press roller 2. The support press roller 2, is known to operate as the central rotatably-driven roller on the outer circumferential band 22 surface of which the material T is supported which must be subjected to printing.

Furthermore, at least one rotatably-driven engraved roller 3 is placed about said press roller 2. Preferably, said at least one engraved roller 3 is constituted by a plurality of rotating engraved rollers 3 (only two are illustrated in the figure) having the function of printing text, colours and/or drawings on the material T supported by the press roller 2. The plurality of engraved rollers 3 more preferably consists of a number from 2 to 12, and each roller forms a character, a script, a drawing and/or a colour on the fabric T when this is transported through and pressed between the press roller 2 and the corresponding engraved roller 3. One roller is sufficient in the case of monochromatic printing. Particularly, each engraved roller 3 may be driven by an independent motor 3M.

Inside the press roller 2 at the nip of two rotating engraved rollers 3, are provided driven holding means 4 preferably being suction fans having the function of sucking forced hot air over the outer surface of the circumferential band 22 of the press roller 2, as shown in FIG. 1 by the wavy arrows, by means of conventional dye drying equipment, not shown (usually, the temperature of the hot air ranges between 50° and 80° C.). The suction fans 4 may be, for example, by simple, entirely conventional fans (not shown), operated by a motor 4M (illustrated diagrammatically in FIG. 2), itself also entirely conventional, such as to suck air from the outside of the press roller 2 towards the inside thereof through the through holes 21. Alternatively, said suction fans 4 are pumps of the suction pump or compressor type.

The function of the suction fans 4 and the through holes 21 made in the circumferential band 22 of the press roller 2 is that of keeping the non-woven-fabric support firmly anchored onto the press roller 2 in order to ensure that, on the one hand, said support does not move during transport along the printing path and on the other hand counteract the formation of said creases.

Preferably, said suction fans 4 are connected to a water separator 5, entirely conventional and diagrammatically illustrated in FIG. 1, in the case where the non-woven-fabric T to be printed is wet. Indeed, in this case, the sucked air is loaded with humidity and in order not to release such humidity into the surrounding environment or directly onto any of the mechanical parts, the equipment may be provided with one or more water separators connected to each suction fan. Particularly, the water separators 5 may be, for example, conventional condensers wherein a fluid is firstly compressed by a compressor and then allowed to expand within a path (coil) to be cooled down. The air sucked in by the suction fans 4 is directed onto the cold surface of the coil, such that the contact with a colder surface causes the release of the water contained thereinto in the form of condensation. Alternatively, the separation of the water occurs purely by mechanical and physical action (centrifugal force and different specific gravity) within a conventional coclea-shaped distillator screw operating according to the principle of a coil still.

The guide means A, B, C, D, E and F are driven rollers. In particular, said guide means are individually and independently motorised.

Furthermore, the roller A is positioned upstream of the equipment, or rather prior to the printing station entrance. This roller A is used for transporting a non-woven-fabric backing directly from the production line (not shown) to the equipment 1 for printing so to have an in-line printing process.

Subsequently, two rollers B and C are positioned in proximity to the press roller 2 at the non-woven-fabric T entrance into the printing station. Rollers B and C are mechanically widening means, i.e. they allow increasing the height of the product and avoiding the formation of creases on the NWF support in the trasversal direction with respect to the length. In other words, the NWF, when subjected to stretching in the longitudinal direction with respect to its length, undergoes a shortening of its height (width). The widening means in question have therefore the function of restoring the original height of the NWF support.

Rollers D, E and F are positioned upstream of the equipment 1, or rather at the end of the printing process. Said rollers D, E and F, have the function of correctly managing (stretch control) the NWF up to the subsequent machine, whether that be a drying oven (in the case of wet printing) or a winder (in the case of dry printing).

Figure 2:
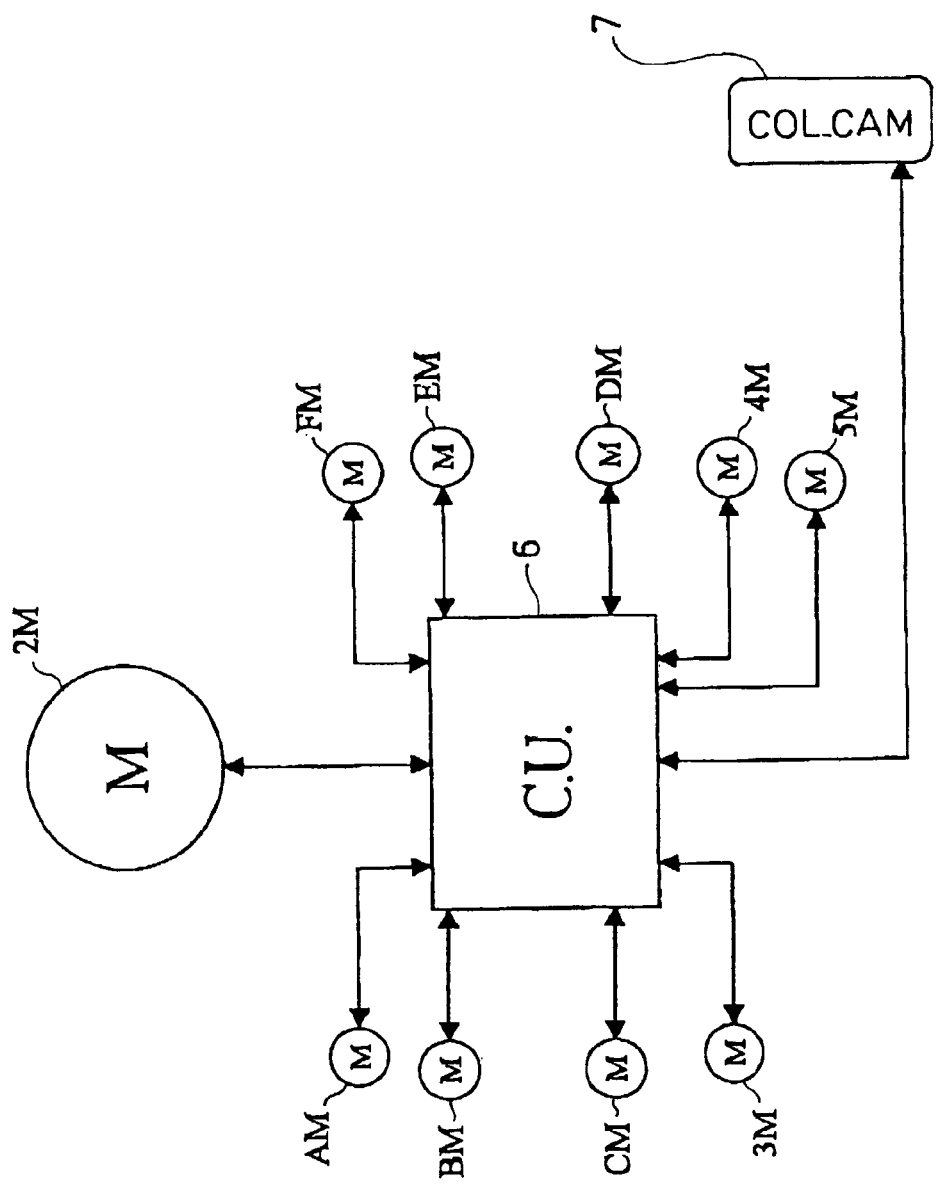
FIG. 2 represents a block diagram of a control and command unit for the equipment of FIG. 1.

Advantageously, the equipment 1 is provided with a control and command unit 6, represented in FIG. 2, having the function of independently controlling and monitoring the driving of all the rotating bodies 2, 3, A, B, D, E, F as well as the suction fans and any possible pumps.

In particular, the control and command unit 6 is operatively directly connected with all mechanical and/or electronic components of the equipment 1 such as to create a single electrical axis for all the components. Said control and command unit 6 is indeed arranged so as to detect electrical signals originating from all the rotating bodies, turn said signals into numerical values representative of the status of their angular speed and torque moment, comparing said numerical values with ratios of pre-established numerical values for said angular speed and said torques and sending signals to said rotating bodies in order to correct any possible variations in said values which fall outwith said ratios.

In particular, the control and command unit 6 is directly and independently connected to the motor 2M of the press roller 2, each motor 3M of the engraved rollers 3, each motor AM, BM, CM, DM, EM, FM of the guide rollers A, B, C, D, E, F as well as to the motor 4M of the suction fans 4 and the motor 5M of any possible water separator 5. Then, the electrical signals are turned into parameters, indicative, for example of the angular speed of the rotating bodies and the couple (torque moment). To this end, the angular speed of the bodies are then compared with one another and referred to preset values fixed for each different body and produced as a function of their inherent characteristics (weight, resistance, elongations). In particular, said preset values are calculated such as to set their ratios defined according to the physical characteristics of the non-woven-fabric or, in other words, according to the typology of the non-woven-fabric, as illustrated in the introductory section of the present description. Accordingly, the drive system and all the rotating bodies must be coordinated such that the feeding of the non-woven-fabric within the equipment does not cause the above mentioned creasing effects. Thus, the control and command unit 6 sends electrical signals to the aforesaid motors so as to correct any possible variations in said preset angular speed values when they fall outwith the defined ratios. In other words, the control and command unit 6 constantly monitors the individual angular speeds of the rotating bodies recording any variations which may occur following any inconsistency in the physical characteristics of the non-woven-fabric sheet, or for example, any variations in thickness, weight or humidity. These variations may cause elongation of the fibres of the non-woven-fabric sheet between one printing station and the subsequent one. Consequently, the print may be altered. Hence, the control and command unit 6 acts on the angular speeds of the rotating bodies themselves in order to balance out any possible stretching effects. For example, if a section of non-woven-fabric support arrives at the first printing station having a greater thickness than the preceding portion already subjected to the first printing process, then its passage through the press roller and the first engraved roller will be slower and the fibres will be subjected to crushing and stretching with respect to the preceding portion. The resulting print may hence not be correctly synchronised with that preceding it. At this point, the angular speed of the roller press, of the engraved rollers which follow said portion as well as all the other rotating bodies will have to be re-equilibrated so as to maintain the aforesaid preset ratio. This adjustment is very important above all considering that the printing process is carried out continuously and in line with the production of the non-woven-fabric (up to high speeds>300 m/min).

Furthermore, it should be noted that the control and command unit 6 also receives electrical signals from the suction fans 4 and from the water separator 5. This way, also the transport of the non-woven-fabric through the various printing stations, i.e. the engraved rollers 3, may be finely adjusted by keeping the non-woven-fabric support well anchored to the support constituted by the press roller 2. Furthermore, the suction and any possible condensation of water may be calibrated according to the typology of non-woven-fabric thus constantly maintaining optimal printing conditions.

Additionally, the control and command unit may also act on the control of the dyes deposited by the engraved rollers 3 by controlling flow, pressure and viscosity.

From what described thus far, it is understood that the equipment 1 for printing on non-woven-fabric allows on the one hand keeping the material support well anchored onto the press roller 2 by means of the suction system, and on the other hand avoiding any undesired elongation of the fibres thanks to the arrangement of the control and command unit 6 on the individual motors of the rotating bodies in order to have the same electrical axis, and in part also thanks to said suction system.

Further control is carried out electronically (through closed loop automatic control) with a continuous correction system for the torque and angular speed of the print rollers. Particularly, the closed loop is made by using a colour video camera system as a transducer which keeps fixed "markers", made during the printing process itself, under control, and intervenes in the case of ratios/distances different from those set and stored. In other words, the closed loop control comprises an image acquiring device 7, represented diagrammatically in FIG. 2, operatively connected to the control and command unit 6 and suitable to constantly control the non-woven-fabric support in order to detect the presence of any creases or variations in the printing with respect to the preset standard. The image acquiring device 7 may be for example a camera or a video camera. A colour digital video camera is particularly preferred, able to film a portion of NWF, for example being outlet from a printing station. The image acquired by the video camera is sent to the control and command unit 6 in the form of electrical signals and converted by said unit into digital data. These digital data are compared with standard data stored in the memory of the control and command unit 6 and representative for example of a text or drawing which must be reproduced on the NWF. A suitable program loaded in said command and command unit will run the comparison operation of the aforesaid data and in the case where it would detect any differences, then it will send electrical signals to the various printing bodies with the aim of modifying, for example, their angular speed in order to correct the error. Alternatively, or simultaneously, the presence of creases along the NWF may be detected by said video camera 7 and corrected in an entirely similar way to that explained previously.

A further object of the present invention is a process for the printing of non-woven-fabric. Said process comprises the following sequential steps:

providing a sheet of non-woven-fabric;
providing an equipment for printing on non-woven-fabric comprising a driven support for the transportation of said non-woven-fabric and at least one driven printing body;
feeding said equipment with said non-woven-fabric sheet;
carrying out the printing on said non-woven-fabric under the control and command of a control and command unit, wherein said control and command unit is operatively connected with said support and at least one printing body such as to detect electrical signals originating from said support and at least one printing body, transforming said signals into numerical values representative of the status of their angular speed and torque moment, comparing said numerical values with ratios of preset numerical values for said angular speed and for said torque moments and sending signals to said support and at least one printing body in order to correct any possible variations of said values which fall out with said ratios.

Preferably, the process comprises a step wherein the motors which operate the rotating bodies of the equipment are separately controlled electronically by a control and command unit such as to make reference to the same electrical axis.

Particularly, the aforesaid control with the aim of having the same electrical reference axis for the motors of the rotating bodies refers to what explained previously with reference to the equipment.

Still more preferably, the monitoring by the control and command unit may be implemented thanks to additional closed loop automatic control comprising the aid of a video camera such as that described above.

The process may also advantageously include an operation step of holding means in order to hold the non-woven-fabric sheet on the outer surface of the support.

The holding means operation step may be carried out using the aspirators described with reference to the equipment which, by sucking air from outside the press roller through the through holes made in the circumferential band, hold the non-woven-fabric in position with the aim of ensuring the correct execution of the printing (print ratio between different dyes/shapes).

Preferably, the method of the invention also comprises a control step of the operating motor for the suction fans 4 by said control and command unit, such as to be able to vary the suction force according to the typology of non-woven-fabric supported and transported by the press roller 2. Indeed, for example, if the non-woven-fabric is a multilayer, then it will be necessary to increase the suction force with respect to a monolayer non-woven-fabric.

Furthermore, the process may comprise a water separation step from the air sucked by the suction fans. Said separation step is preferably carried out using separators as previously exemplified with reference to the equipment.

The printing step is carried out through standard flexographic (ink) or serigraphic (coloured paste) methods, whereby they will not be described herein in any further detail. It should be noted however that the process and the equipment of the invention allow printing text and/or drawings/figures with as many dyes as there are engraved rollers arranged about the roller press. Preferably, printing may be carried out with from 2 to 12 dyes and the process may consequently include a dye management step.

Advantageously, furthermore, the method may comprise an enlargement stage in order to ensure, besides the above stretching control, also the maintenance of the height of the product.

The non-woven-fabric which may be subjected to the printing process of the invention preferably consists of the fibres listed in the introductory section of the present description, individually or in mixed products or three-layered products with cellulose pulp, or "fluff pulp" in the centre or in two fibre/fluff pulp layers.

In general, the production of non-woven-fabric provides the deposition of said fibres, in an entirely conventional manner, whilst in the molten state on a mat and left to solidify to form a layer or film. Afterwards, the film is normally consolidated using treatments such as those defined in the introductory section of the description.

Particularly, if the non-woven-fabric is formed in accordance with the spun-lace method, then it has grammage characteristics comprised of between 30 and 150 g/m$^2$ and fibre lengths comprised of between 0.8 mm and 6 mm (short mono- and bi-component fibres) and fluff pulp with length following mechanical "opening"<2.5 mm.

Alternatively, if it is formed in accordance with the spun-bonded method, then it has a grammage comprised of between 10 and 100 g/m$^2$ and continuous fibres, both for the monolayer and three layered product (two of spun-bonded with pulp in the centre).

At this point, the non-woven-fabric thus obtained in the form of a single film may be directly subjected to the printing process according to the invention, or may be first further processed in order to obtain a composite material.

Normally, non-woven-fabric composite materials are sandwich type structures comprising two outer layers obtained with the spun-lace or spun-bonded method, between which there is generally a cellulose or cellulose derivative pulp layer, subsequently hydroentangled.

The production of composite non-woven-fabric normally provides the deposition of a first layer of non-woven-fabric on a suitable backing, the deposition on said first layer of cellulose pulp, the deposition of a second layer of non-woven-fabric, consolidation by hydroentangling and final drying. Preferably, following the deposition of the first layer of non-woven-fabric, a hydraentangling step may be carried out followed by drying.

As explained above, the non-woven-fabric may be printed on both whilst wet and dry. If the product subjected to printing is wet, the percentage of residual humidity is generally comprised of between 80% and 200% with respect to the weight of the dry product. If instead, the product subjected to printing is dry, the percentage of residual humidity may vary from 0% to 10%.

From what described, the equipment and process in accordance with the invention allow obtaining a multicolour printed non-woven-fabric having a height up to 3500 mm, preferably a height ranging between 30 and 3500 mm, even more preferably ranging between 100 and 3500 mm.

The printed non-woven-fabric may be advantageously produced with a continuous print speed up to 400 m/min, preferably ranging between 20 m/min and 300 m/min.

The NWF may be printed over only a small % age with respect to its surface (2-3%) up to a coverage of 100% of its surface, depending on the use of the NWF itself, i.e.: personal hygiene, domestic hygiene, matting, non-woven fabric for clothing, table-cloths, handkerchiefs, curtains (furnishings), bags, containers for items.

The characteristics just described allow operating under absolutely advantageous manufacturing conditions with respect to the technologies and the equipment of the prior art, and being carried out directly on a spun-lace production line besides obviously on a suitable off-line.

Furthermore, the aforesaid adjustments of the control and command unit avoid the problems associated with the formation of creases as well as the danger of tearing the non-woven-fabric support despite maintaining a high print speed.

Obviously, those skilled in the art, with the aim of satisfying contingent and specific needs, can carry out a number of modifications and variations to the equipment and to the process for printing on non-woven-fabric, all however contained within the scope of the invention such as defined by the following claims.

For example, it is possible to store the machine dynamics control program on suitable electronic recipes, monitorable through an electrical axis, electronic colour control and closed loop video camera.

Figure 3:
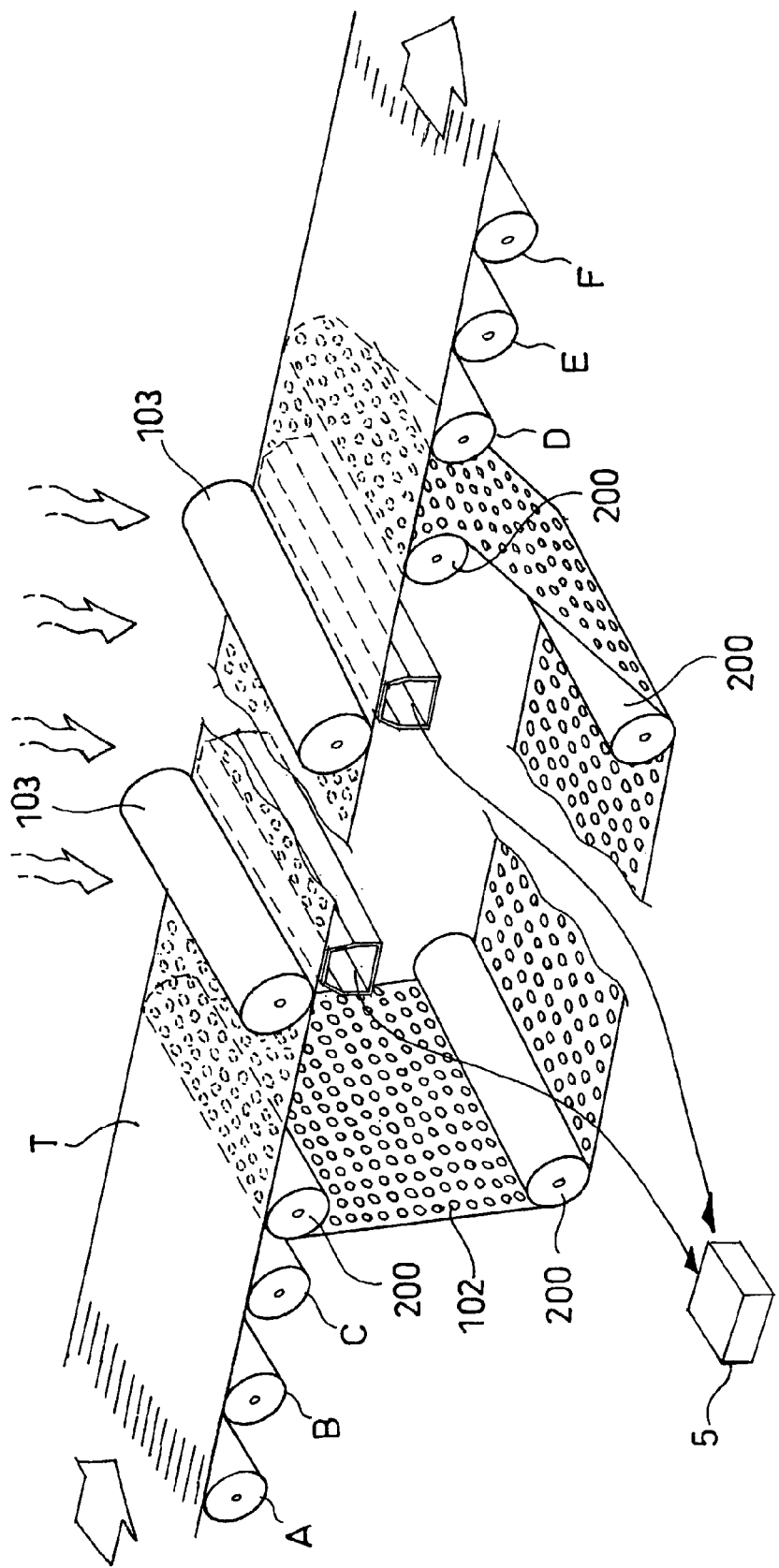
FIG. 3 represents a second embodiment of an equipment for printing on non-woven-fabric (spun-lace, spunbonded, mechanically needle entangled, entangled and coated) in accordance with the invention.

According to a further embodiment of the invention, shown in FIG. 3, in the equipment 100 the press roller 2 is substituted by a belt press 102, onto which press a plurality of engraved rollers 103 (up to a number of 12 rollers). The press belt 102 is constituted by a tape, closed on itself and provided with through holes 121, of such dimensions as to house the NWF T to be printed. The press belt 102 is supported in a rotating manner by a plurality of rollers 200. Such equipment will naturally comprise a plurality of guide rollers A-F and, aside from the substitution of the press roller with the press belt, will be entirely similar to the first embodiment described above with reference to FIGS. 1 and 2. Therefore, reference is made to the previous description for understanding the structure and the operation of the present equipment, wherein the reference numerals identical to the reference numerals reported herein, have the same meaning.

The invention claimed is:

1. A process for the printing of non-woven-fabric comprising the steps of:
providing a non-woven-fabric sheet;
providing an equipment for printing on non-woven-fabric comprising a driven support for the transportation of said non-woven-fabric, at least one driven printing body and holding means;
feeding said equipment with said non-woven-fabric sheet;
performing the printing on said non-woven-fabric under the control and command of a control and command unit, and
constantly monitoring said non-woven fabric with an image acquiring device in order to detect the presence of creases or variations in the printing with respect to a preset standard;
wherein said support are rotating bodies sending electrical signals to the control and command unit;
wherein said image acquiring device keeps fixed markers, made during the process itself, constantly under control to detect the presence of any creases or variations in the printing with respect to a preset standard, and said image acquiring device acquires an image of said non-woven fabric and sends electrical signals representative of said acquired image to said control and command unit;
wherein said control and command unit detects the electrical signals originating from said rotating bodies and compares said data to preset values that are calculated according to typology of the non-woven-fabric;
wherein said control and command unit detects the electrical signals originating from said image acquiring device, compares said electrical signals with standard data stored in said control and command unit, the data being representative of a text or drawing to be reproduced on the non-woven fabric and, if any differences are detected, said control and command unit sends electrical signals to said support and at least one printing body in order to modify their respective angular speeds and torque moments to correct said differences;
wherein the holding means holds the non-woven-fabric sheet onto the outer surface of the support, and operation of the holding means is achieved by suction fans which, by sucking air from the outside towards the inside of the support through holes, hold the non-woven-fabric onto said support; and
wherein said control and command unit receives electrical signals from said suction fans so that the transport of the non-woven-fabric is adjusted by keeping the non-woven-fabric support well anchored to the press roller and the suction is calibrated according to the typology of the non-woven-fabric.

2. The process according to claim 1, wherein said control and command unit acts separately and independently on each motor which operates the corresponding rotating body of the equipment such as to make reference to the same electrical axis.

3. The process according to claim 1, comprising a separation stage of the water from the air sucked in by the suction fans.

4. The process according claim 1, wherein the printing stage occurs by means of flexographic (ink) or serigraphic (colored paste) methods.

5. The process according to claim 4, comprising a dye control stage by the control and command unit through the optimization of the characteristics of each dye, such as flow, pressure and viscosity, depending on the type of non-woven-fabric to be printed.

6. The process according to claim 1, comprising a widening stage in order to ensure the maintenance of the product height.

7. The process according to claim 1, wherein printing takes place at a speed of up to 400 m/min on a sheet of wet or dry non-woven-fabric.

8. Non-woven-fabric obtainable by means of the process according to claim 1.

9. The non-woven-fabric according to claim 8 characterized by having multicolor text and/or drawings.

10. Equipment for printing on non-woven-fabric, comprising a driven support provided with through holes so as to transport a sheet of non-woven-fabric, at least one driven printing body for implementing the printing and driven holding means which interacts with said support in order to hold said sheet onto said support, and an image acquiring device operatively connected to a control and command unit, the image acquiring device constantly monitoring the non-woven fabric in order to detect the presence of creases or variations in the printing with respect to a preset standard, wherein said support comprises rotating bodies sending electrical signals to the control and command unit; wherein the image acquiring device keeps fixed markers, made during the process itself, constantly under control to detect the presence of any creases or variations in the printing with respect to a preset standard, and said image acquiring device acquires an image of the non-woven fabric and sends electrical signals representative of the acquired image to the control and command unit, wherein said control and command unit detects the electrical signals originating from said rotating bodies and compares the signals to preset values that are calculated according to the typology of the non-woven-fabric; wherein the control and command unit detects electrical signals originating from the image acquiring device, compares said electrical signals with standard data stored in said control and command unit, the data being representative of a text or drawing to be reproduced on the non-woven-fabric and, if any differences are detected, said control and command unit sends electrical signals to said support and at least one printing body in order to modify their respective angular speeds and torque moments to correct said differences, and said holding means holds the non-woven-fabric sheet onto the outer surface of the support, and operation of the holding means is achieved by suction fans which, by sucking air from the outside towards the inside of the support through holes, hold the non-woven-fabric onto said support; and wherein said control and command unit receives electrical signals from said suction fans so that the transport of the non-woven-fabric is adjusted by keeping the non-woven-fabric support well anchored to the press roller, and the suction is calibrated according to the typology of the non-woven fabric.

* * * * *